Nov. 5, 1957
H. E. CIER ET AL  2,812,302
PHOTOSULFOCHLORINATION OF HYDROCARBONS AND THE LIKE
Filed Aug. 18, 1954
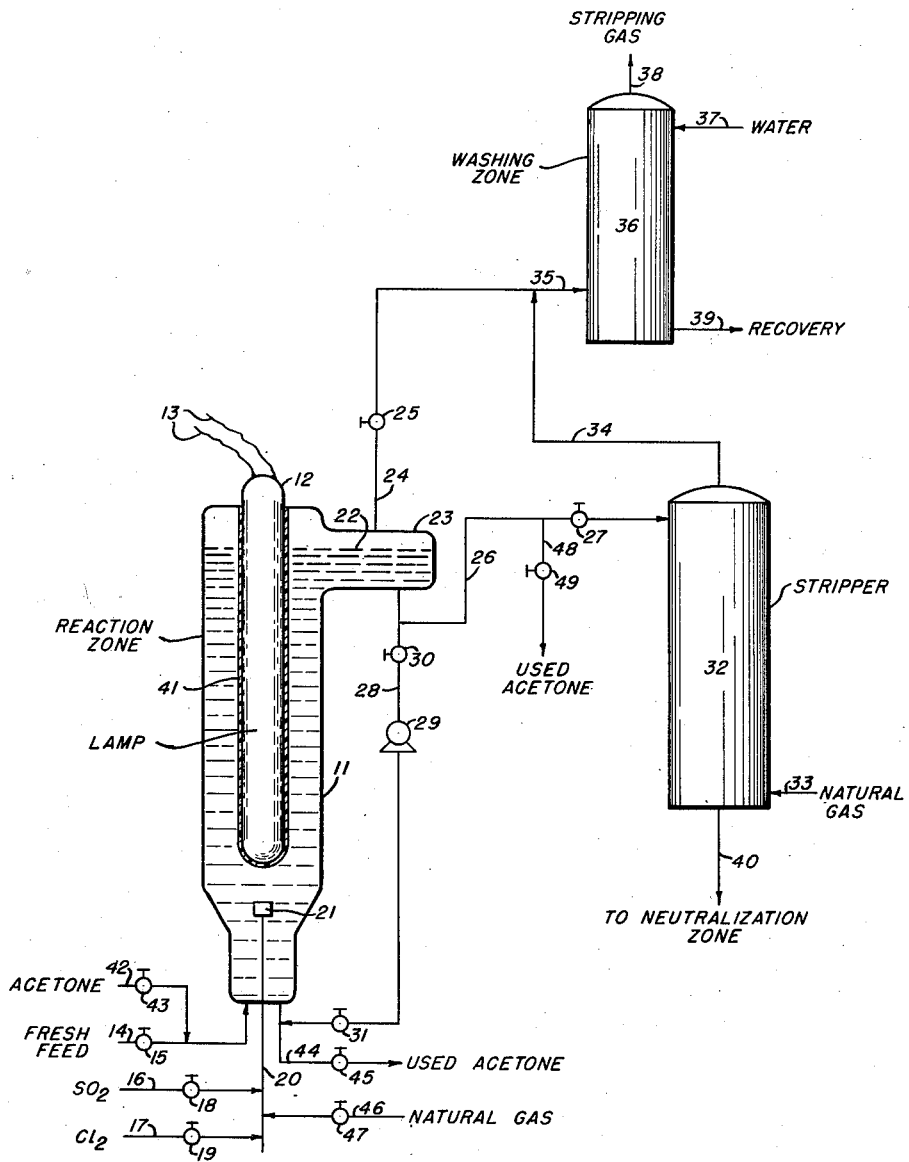
INVENTORS.
Everett W. Lewis,
Harry E. Cier,
Albert T. Watson,
BY
ATTORNEY United States Patent Office 2,812,302
Patented Nov. 5, 1957

2,812,302

PHOTOSULFOCHLORINATION OF HYDROCARBONS AND THE LIKE

Harry E. Cier, Everett W. Lewis, and Albert T. Watson, Baytown, Tex., assignors, by mesne assignments, to Esso Research and Engineering Company, Elizabeth, N. J., a corporation of Delaware Application August 18, 1954, Serial No. 450,824

10 Claims. (Cl. 204—162)

The present invention is directed to the photosulfochlorination of hydrocarbons and the like. More particularly, the invention is directed to a process and method for improving the efficiency of photosulfochlorination reactions. In its more specific aspects, the invention is directed to a method for treating reaction zones in which photosulfochlorination reactions take place.

The present invention may be briefly described as a photosulfochlorination process in which a mixture of a hydrocarbon or organic compound, sulfur dioxide and chlorine is exposed to reaction conditions including temperatures and pressures and light radiation to form a hydrocarbon sulfonyl chloride product in which a film of resins is deposited on the wall of the reaction zone through which the light is transmitted from the radiation source. The particular feature of the present invention is periodically interrupting the exposure or terminating the reaction and washing the film of resins from the exposed wall of the reaction zone with a ketone, such as acetone, methyl ethyl ketone, and the like.

The hydrocarbons feed stock employed in the present invention is preferably a lubricating oil fraction but other hydrocarbons may be used, such as paraffinic and naphthenic hydrocarbons of lower boiling range. The fact of the matter is that the lubricating oil fraction may be composed principally of paraffinic and naphthenic hydrocarbons and mixtures thereof. As an example of the paraffinic hydrocarbons which may be employed in the present invention may be mentioned the normal paraffins, such as hexanes, heptanes, octanes, nonanes, decanes and the higher members of the same homologous series. With respect to the naphthenic hydrocarbons, mention may be made of the naphthenic hydrocarbons having from about 6 to about 30 carbon atoms in the molecule, examples of which include cyclohexane and the substituted cyclohexanes, and the substituted cyclopentanes and cyclo-heptanes and the like.

The reaction conditions may suitably include a temperature in the range from about 75° to about 225° F. with a temperature of about 150° F. being satisfactory when lubricating oil fractions are used as a feed. Pressures may range from approximately atmospheric up to about 150 pounds per square inch. The light radiation employed suitably may be in the range from about 3000 to 4500 A.

When the film formed on the exposed reactor surfaces of the reaction zone is about 1.1 microns in thickness, it absorbs about 50% of the light transmitted at about 3600 A. This film may be removed by periodically interrupting or terminating the reaction and removing the charge mixture from the reaction zone followed by a washing operation with a ketone, such as acetone, methylethyl ketone, and the like. As examples of other ketones which may be satisfactory in the present invention mention may be made of: diethylketone, cyclohexanone, cyclopentanone and acetophenone.

The invention will be further illustrated by reference to the drawing in which the single figure illustrates a preferred mode. Referring now to the drawing, numeral 11 designates a reaction zone provided with a source of radiation designated by lamp 12 which extends into the reaction zone 11 and is provided with electrical leads 13 connected to a source of energy, not shown. The reaction zone 11 has formed therewith a disengaging vessel 23 which may be a separate vessel as desired. A feed stock, such as a lubricating oil fraction or one described supra, is introduced into zone 11 by way of line 14 controlled by valve 15 from a source not shown. Also introduced into the reaction zone 11 by way of lines 16 and 17 controlled, respectively, by valves 18 and 19 are sulfur dioxide and chlorine from a source not shown. The mixture of sulfur dioxide and chlorine is introduced into the feed hydrocarbon by line 20 through nozzle 21 and the resultant mixture flows concurrently upwardly through the reaction zone 11 and a level 22 of the reaction mixture is maintained in zones 11 and 23. From the disengaging vessel 23 a gaseous mixture comprising principally hydrogen chloride is withdrawn by line 24 through valve 25 which ultimately connects into zone 36 for disposal of the gases.

The reaction mixture is discharged from disengaging vessel 23 by line 26 through valve 27 and is routed thereby into a stripping zone 32 which suitably may be equipped with vapor-liquid contacting means, such as bell cap trays or other similar equipment or packing materials.

Alternatively, a portion of the hydrocarbon from the reacted mixture may be recycled to the reaction zone 11 by withdrawal from disengaging vessel 23 by pumping with pump 29 through line 28 with valve 30 and valve 31 opened. It is to be understood, of course, that when the reaction operation is conducted without recycle operation, valve 30 and valve 31 will be closed.

Stripper 32 is provided with line 33 for introducing a gas, such as natural gas or hydrocarbon, such as methane or ethane thereto. The natural gas serves to remove dissolved gases from the reacted mixture under the conditions prevailing in stripper 32 which may include a temperature in the range from 150° F. to 200° F. and a pressure in the range from approximately atmospheric up to about 150 pounds per square inch gauge. These dissolved gases are discharged from stripper 32 by line 34 and admixed in line 35 with the gases from disengaging vessel 23. This mixture of gases is introduced by line 35 into a washing zone 36 which may be equipped with packing material or vapor-liquid contacting means, such as bell cap trays. In zone 36, water or an alkaline solution, such as dilute caustic, is introduced by line 37 to wash the acidic gases from the material in zone 36, the stripping gases, such as hydrocarbons, being withdrawn by line 38 while the solution containing the absorbed or dissolved gases it withdrawn by line 39 for discard or recovery as may be desired.

The product from stripping zone 32 which is substantially free of gases is removed therefrom by line 40 and sent to a neutralization zone, not shown, for neutralizing of the hydrocarbon sulfonyl chloride product and to form the corresponding sulfonates.

During the operation of the aforedescribed process a film of resins indicated by the numeral 41 is built up on the exposed wall of the lamp 12 and gradually reduces the efficiency of the reaction since this film when only 1.1 microns in thickness has been found to absorb over 50% of the light radiation having wave lengths of 3600 A. Therefore, in accordance with the present invention, line 42 is controlled by valve 43 which connects to a source of acetone and allows acetone or other effective ketones to be introduced into the reaction zone 11. The reaction zone 11 is also provided with line 44 for withdrawal of the used acetone by opening valve 45. The reaction zone 11 is provided with line 46 controlled by valve 47 for agitating the contents of the reaction zone 11, when the reaction has been terminated and the reaction mixture withdrawn therefrom, for the acetone washing operation.

In accordance with the present invention when the film 41 has built up to a degree that the efficiency of the reaction is impaired, the charging of the feed and the reactant gases, sulfur dioxide and chlorine, is terminated and the exposure of the reaction mixture is interrupted. The reaction zone 11 and the disengaging tank 23 may be freed of the reaction mixture by discharge through line 44 controlled by valve 45 and the reaction mixture replaced by a ketone, such as acetone introduced by line 42 and through line 14 to submerge the exposed walls of the lamp 12 on which the film 41 has been deposited. The contents of the reaction zone 11 may then be agitated with natural gas introduced by line 46 controlled by valve 47 and thereafter the used acetone may be withdrawn by line 44 controlled by valve 45.

Alternatively, the acetone may be circulated through the reaction zone 11 and vessel 23 flowing by way of line 42 into line 14 into the vessel 11 overflowing into disengaging vessel 23 into line 26 and then by line 48 from the system by opening valve 49. It is to be understood, of course, that, when the washing operation is conducted by circulation, valve 27 and valve 45 will be closed. It is contemplated that the washing operation may be conducted by circulation and with natural gas as may be desired.

It will be seen from the foregoing brief description of our invention that an improved process is provided which is simple to operate and which increases the efficiency of the reaction to a marked extent.

In order to illustrate the invention further, hydrocarbon sulfonyl chlorides were formed in an operation in which a dark, resinous film built up on the outer surface of the lamp which was providing radiation. An inspection of the spectral characteristics of this film during a shut-down period of the operation showed that the film absorbed about 50% of the light transmitted at 3600 A., seriously reducing the photochemical efficiency by loss of reaction light to the reaction mixture. Thereafter the reactor walls were washed with acetone at regular intervals of about 150 hours to remove the film which deposited continuously during the operating cycle on the exposed surfaces. During the washing operations 3 volumes of acetone per volume of reactor were employed. The liquid acetone in the vicinity of the exposed walls was agitated by introducing natural gas into the bottom of the reactor at the rate of about 2 standard cubic feet per minute per cubic foot of reactor volume. The results of these runs are shown in the following table:

cause a drop in conversion of 12.5% based on the conversion obtained with a clean reactor wall. The selectivity of the chlorine to a sulfonyl chloride had also decreased.

The acetone wash was also carried out prior to run PR–24 which shows that the acetone wash completely removed the film of resins and restored photochemical efficiency such that during run PR–24 conversions were obtained identical to that obtained with clean reactor walls during run PR–20. The chlorine selectivity was increased to that previously obtained with a clean reactor wall. These data demonstrate to a marked degree the surprising results obtained by washing the exposed walls of the reactor vessel employing a photosulfochlorination operation in improving and maintaining the photochemical efficiency.

Thus the invention is of considerable utility in that the washing procedure allows a commercial plant to be built with minimum capacity and yet obtain maximum efficiency. For example, it is possible that at rates of 1 gallon oil per 40 watt lamp and a 50% conversion level, the percentage reduction in conversion per day is about 5%. Employing the washing operation with the ketone provides additional capacity and insures maintenance of high conversion levels and also allows the photosulfochlorination operation to produce high concentration of sulfonyl chlorides for subsequent neutralization to the sulfonates. It will be seen that the present invention is of considerable utility and advantage.

While the washing operations may be conducted at regular intervals of about 150 hours, it is contemplated that the washing operations may be conducted after operating from about 25 up to about 300 hours. In short, under some conditions it may be desirable to interrupt the operation and wash the reactor wall after about 25 hours; under other conditions reaction may be conducted for as much as 300 hours before the washing step is practiced.

The nature and objects of the present invention having been completely described and illustrated, what we wish to claim as new and useful and to secure by Letters Patent is:

1. A method for maintaining a continuous photosulfochlorination reaction at a high conversion level which comprises exposing a charge mixture consisting of hydrocarbon, sulfur dioxide, and chlorine flowing through a reaction zone to light radiation at a temperature in the range between 75° and 225° F. in which a hydrocarbon sulfonyl chloride product is formed and in which a light absorbing film of resins is deposited on an exposed wall of said reaction zone, periodically interrupting said ex-

|  | Acetone Wash Operation | Run No. PR-20 | Run No. PR-23 | Acetone Wash Operation | Run No. PR-24 |
|---|---|---|---|---|---|
| Accumulative Run, Hrs. |  | 1-47 | 112-143 |  | 0-29 |
| Operating Conditions: |  |  |  |  |  |
| Reactor Top Temp., °F. |  | 179 | 181 |  | 174 |
| Reactor Jacket Water Temp., °F. |  | 150 | 150 |  | 150 |
| Reactor Pressure, p. s. i. g. |  | 20 | 20 |  | 20 |
| Fresh Oil Feed, Parts/Hr. |  | 8.0 | 8.0 |  | 7.9 |
| $SO_2$/Oil Mole Ratio |  | 2.2 | 2.1 |  | 2.2 |
| $Cl_2$/Oil Mole Ratio |  | 1.6 | 1.6 |  | 1.6 |
| Acetone Wash. Vol.: Acetone/Vol. Reactor | 3 |  |  | 3 |  |
| Wt. Percent $RSO_2Cl$ in Product |  | 26.0 | 22.7 |  | 26.0 |
| Wt. Percent Cl in Product as RCl |  | 6.75 | 6.52 |  | 6.03 |
| $Cl_2$ Selectivity to $RSO_2Cl$, Percent of $Cl_2$ Reacted |  | 20.2 | 18.7 |  | 22.1 |
| Drop in Conversion Due to Film, Percent From Clean Well |  | Nil | 12.5 |  | Nil |

It may be seen from the results presented above that the conversion to sulfonyl chlorides during run PR–20, which employed a clean reactor surface immediately following the acetone washing operation, was at a level of 26.0 weight percent of sulfonyl chloride in the product. After extended operation of 112 hours, run PR–23 was made at the same operating conditions and the conversion to hydrocarbon sulfonyl chloride was 22.7 weight percent. Sufficient film had built up on the exposed reactor wall to posure after about 25 to about 300 hours, removing said mixture from the reaction zone, and washing the reaction zone with a solvent consisting of a ketone selected from the group consisting of acetone, methylethyl ketone, diethyl ketone, cyclohexanone, cyclopentanone, and acetophenone to remove said film of resins from the exposed wall, and then again exposing charge mixture to light radiation at said temperature in said washed reaction zone.

2. A method in accordance with claim 1 in which the solvent consists of methylethyl ketone.

3. A method in accordance with claim 1 in which the ketone is acetone.

4. A method for maintaining a continuous photosulfochlorination reaction at a high conversion level which comprises exposing a charge mixture consisting of hydrocarbon, sulfur dioxide and chlorine flowing through a reaction zone to light radiation at a temperature in the range between 75° and 225° F. in which a hydrocarbon sulfonyl chloride product is formed and in which a light absorbing film of resins is deposited on an exposed wall of said reaction zone, periodically interrupting said exposure after about 25 to about 300 hours, removing said mixture from the reaction zone, introducing a solvent consisting of a ketone selected from the group consisting of acetone, methylethyl ketone, diethyl ketone, cyclohexanone, cyclopentanone, and acetophenone in the liquid phase into said reaction zone into contact with said film, agitating said acetone to remove said film from the exposed wall, and then again exposing charge mixture to light radiation at said temperature in said washed reaction zone.

5. A method in accordance with claim 4 in which the acetone is agitated by blowing gas into the ketone.

6. A method for maintaining a continuous photosulfochlorination reaction at a high conversion level which comprises charging a charge mixture consisting of hydrocarbon, sulfur dioxide and chlorine into and through a photosulfochlorination reaction zone, exposing said mixture to light radiation at a temperature in the range between 75° and 225° F. to form a hydrocarbon sulfonyl chloride product and to deposit a light absorbing film of resins on an exposed wall of said reaction zone, periodically terminating said exposure and the charging of said mixture after about 25 to about 300 hours, washing said exposed wall during the time said exposure and charging is terminated with a solvent consisting of a ketone selected from the group consisting of acetone, methylethyl ketone, diethyl ketone, cyclohexanone, cyclopentanone, and acetophenone to remove said film, and then again exposing charge mixture to light radiation at said temperature in said washed reaction zone.

7. A method in accordance with claim 6 in which the ketone is acetone.

8. A method in accordance with claim 6 in which the hydrocarbon is lubricating oil.

9. A method in accordance with claim 4 in which the ketone is agitated by blowing gas into the acetone.

10. A method in accordance with claim 4 in which the ketone is agitated by circulating it over the exposed wall.

References Cited in the file of this patent

UNITED STATES PATENTS

| | | |
|---|---|---|
| 2,197,800 | Henke et al. | Apr. 23, 1940 |
| 2,610,166 | Parry et al. | Sept. 9, 1952 |
| 2,749,313 | Williams et al. | June 5, 1956 |